United States Patent
Annic et al.

(10) Patent No.: US 6,306,043 B1
(45) Date of Patent: Oct. 23, 2001

(54) MOTOR VEHICLE DOUBLE FLYWHEEL TORSIONAL DAMPER

(75) Inventors: Pascal Annic, Saint Herblain (FR); Hyoun Nam Cho, Taegu (KR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/424,408

(22) PCT Filed: Mar. 26, 1999

(86) PCT No.: PCT/FR99/00712

§ 371 Date: Feb. 14, 2000

§ 102(e) Date: Feb. 14, 2000

(87) PCT Pub. No.: WO99/50570

PCT Pub. Date: Oct. 7, 1999

(30) Foreign Application Priority Data

Mar. 27, 1998 (FR) .................................................. 98 03805

(51) Int. Cl.[7] ...................................................... F16D 3/14
(52) U.S. Cl. .............................. 464/62; 464/68; 192/213.2
(58) Field of Search ................................... 464/61, 62, 63, 464/64, 65, 66, 67, 68, 98, 99; 192/213.2

(56) References Cited

U.S. PATENT DOCUMENTS

| 799,388 | * | 9/1905 | Keyes .................................. 464/63 |
| 1,952,564 | * | 3/1934 | Prins .................................... 464/63 |
| 4,027,757 | * | 6/1977 | Radke et al. ...................... 192/106.1 |
| 4,139,995 | * | 2/1979 | Lamarche ............................. 464/68 |
| 4,279,132 | * | 7/1981 | Lamarche ............................. 464/68 |
| 4,304,107 | * | 12/1981 | Fall et al. ............................. 464/68 |
| 4,360,352 | * | 11/1982 | Lamarche ............................. 464/64 |
| 4,422,535 | * | 12/1983 | Ling ..................................... 464/63 |
| 4,471,863 | * | 9/1984 | Lech, Jr. .............................. 464/63 |
| 4,585,427 | * | 4/1986 | Lamarche ............................. 464/67 |
| 4,891,033 | * | 1/1990 | Heyser ................................. 464/68 |
| 4,947,700 | * | 8/1990 | Kern et al. ........................... 464/68 |
| 5,246,399 | * | 9/1993 | Yanko et al. ........................ 464/62 |
| 5,295,910 | * | 3/1994 | Friedmann ........................... 464/63 |
| 5,307,710 |   | 5/1994 | Feldhaus et al. . |

FOREIGN PATENT DOCUMENTS

| 3823384A1 | 1/1990 | (DE) . |
| 2605696A1 | 4/1988 | (FR) . |

* cited by examiner

Primary Examiner—Lynne H. Browne
Assistant Examiner—Kenn Thompson
(74) Attorney, Agent, or Firm—Liniak, Berenato, Longacre & White

(57) ABSTRACT

The invention concerns a torsional damper with circumferential action for a motor vehicle double flywheel, designed to be arranged between the double flywheel primary and secondary flywheels, the primary flywheel being designed to be connected to the vehicle engine crankshaft and the secondary flywheel being 60 designed to receive a clutch mechanism, comprising a first element (10) adapted to be connected to one of said flywheels, a second element (20) adapted to be connected to the other flywheel, said damper comprising elastic means (30, 40) associated with friction means, said elastic means consisting of at least a first spring assembly (30) functioning in series via first phasing washers (51, 53): said elastic means further comprise a second spring assembly (40) functioning in series via second phasing washers (52, 54), said first and second nests of springs (30, 40) functioning in series via a phasing assembly (60).

20 Claims, 9 Drawing Sheets

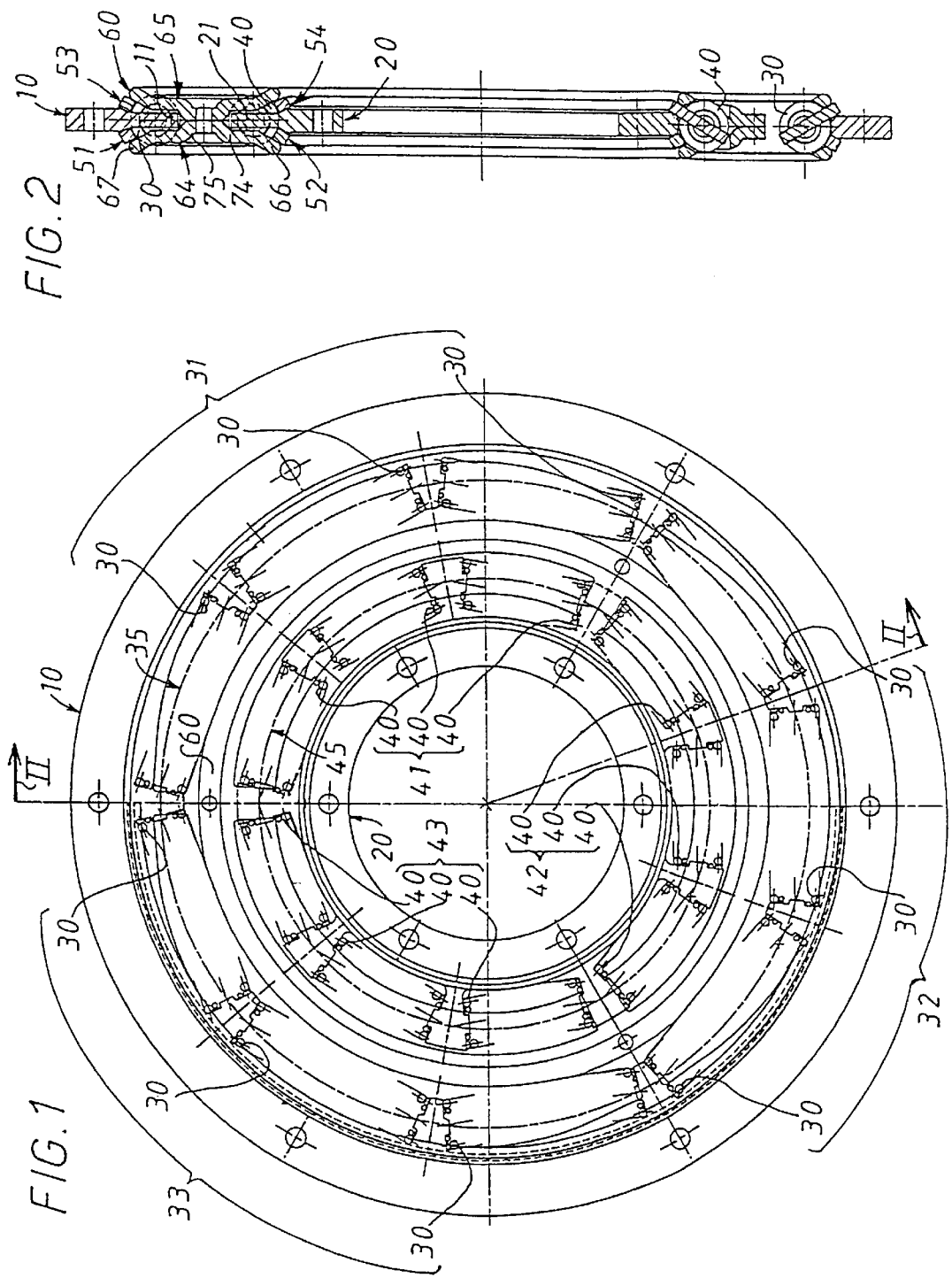

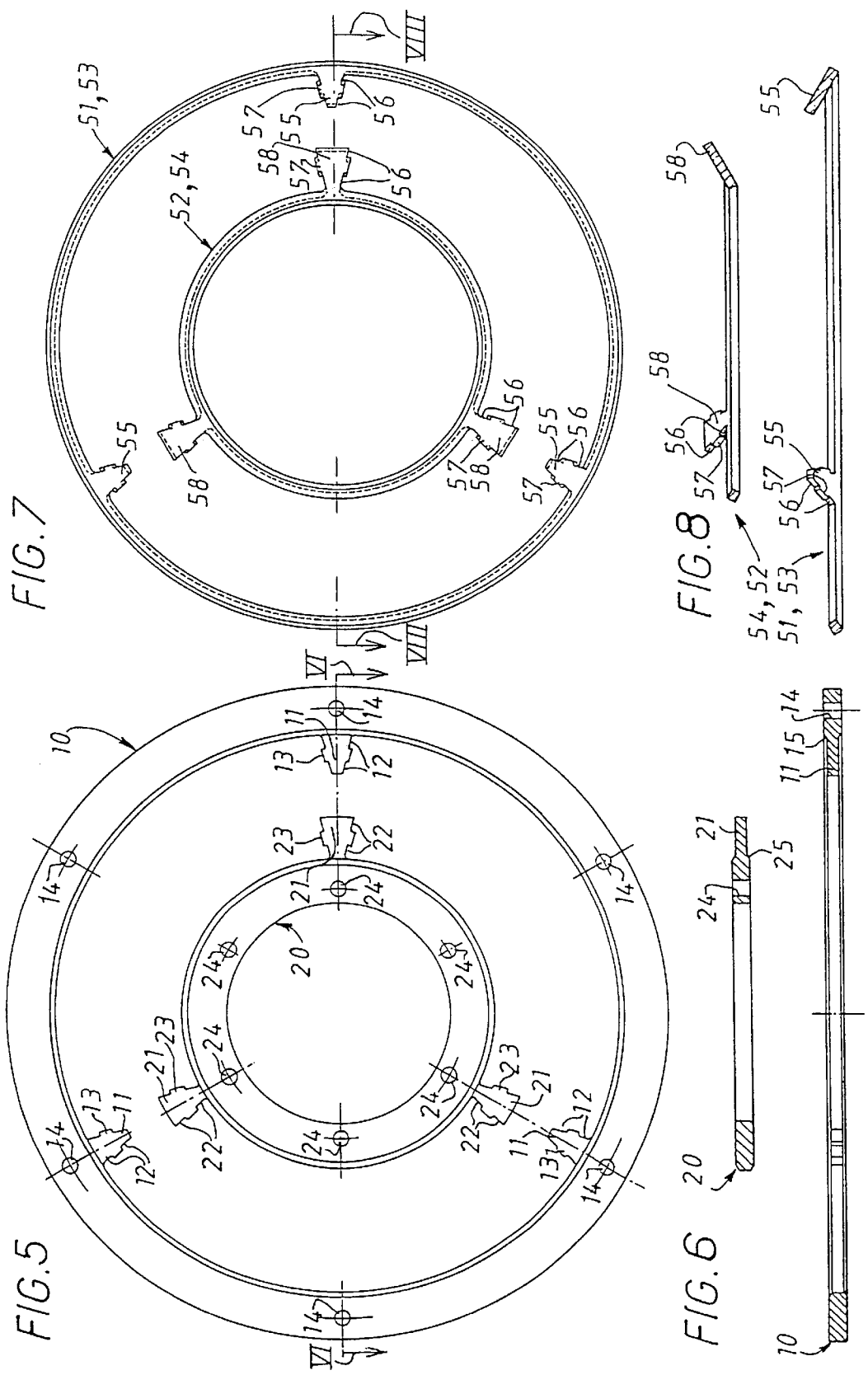

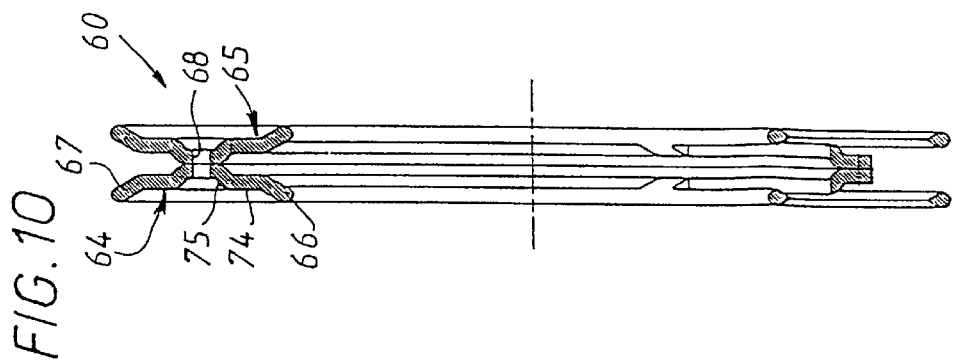
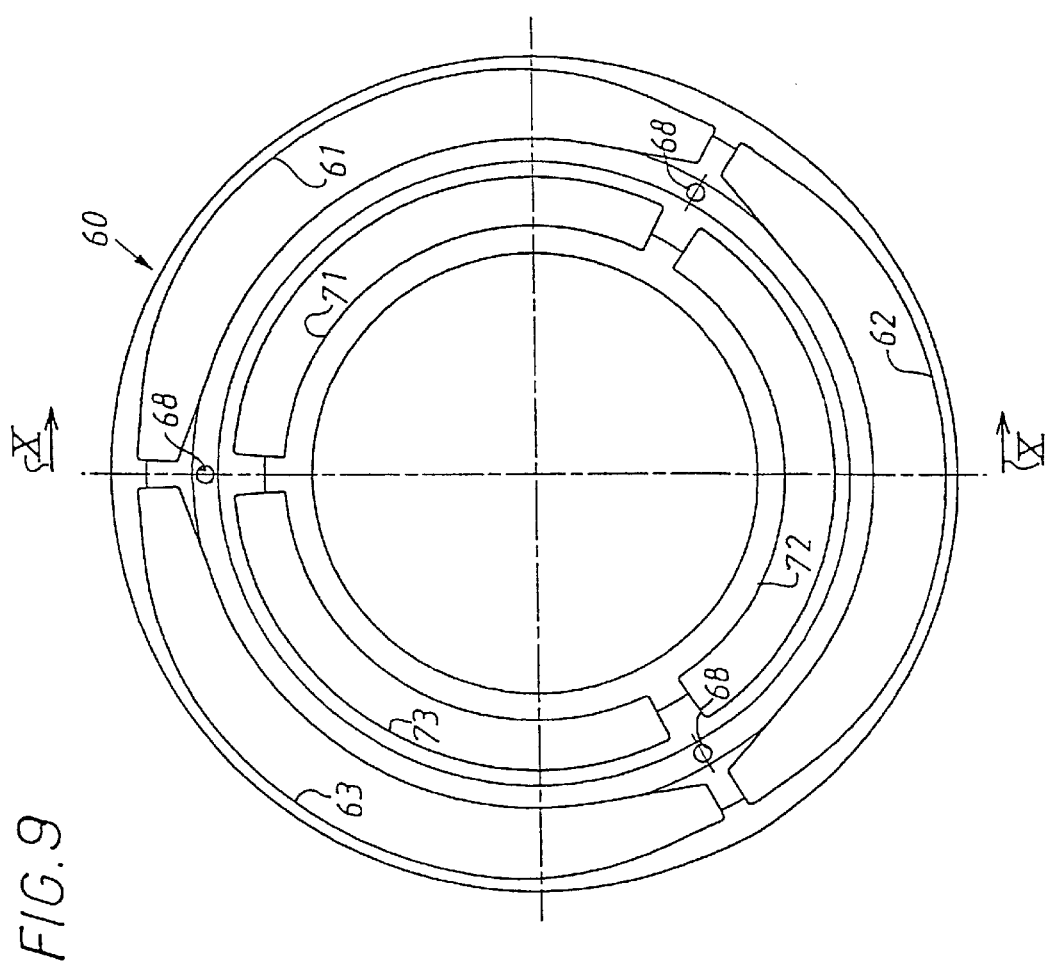

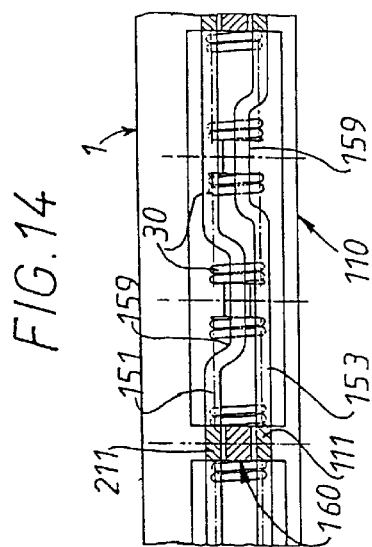
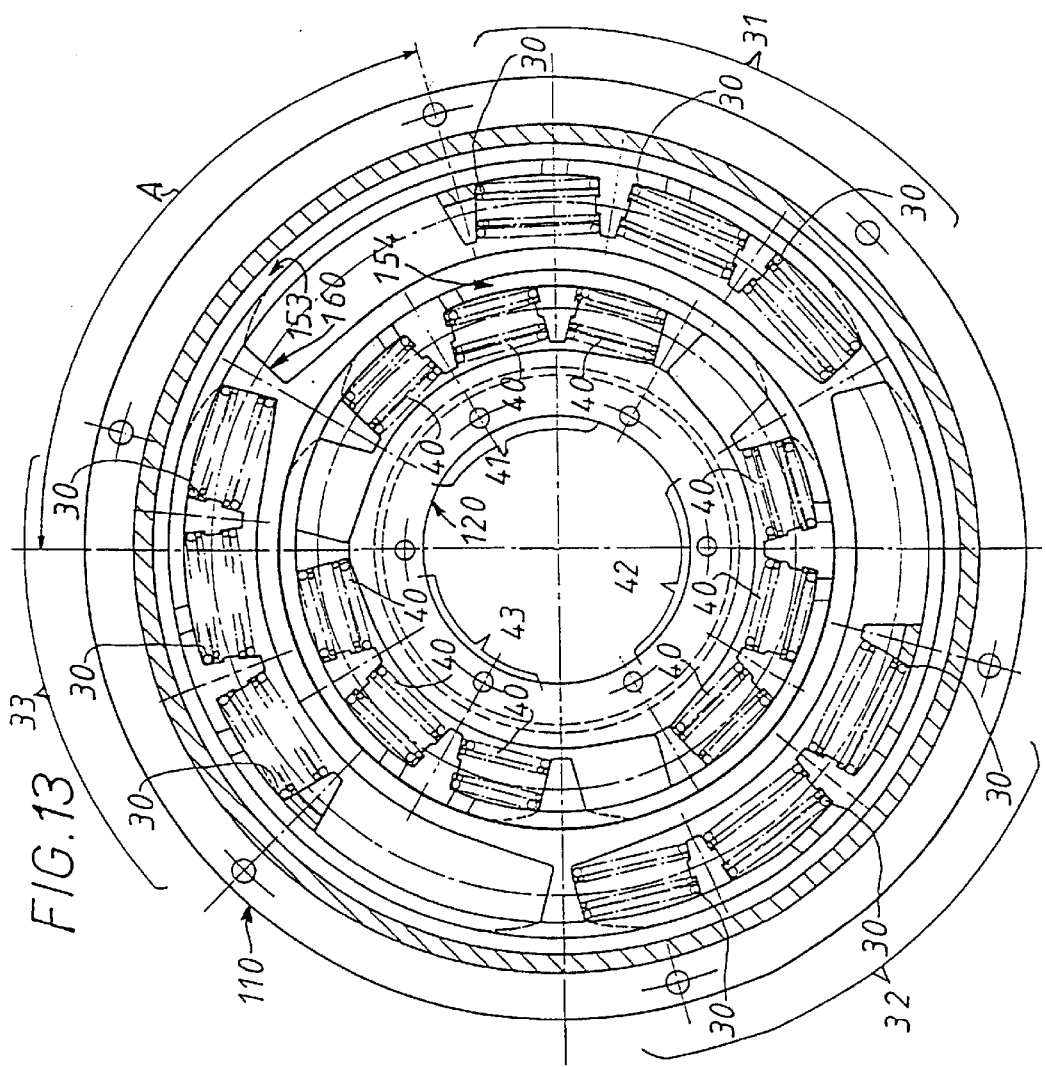

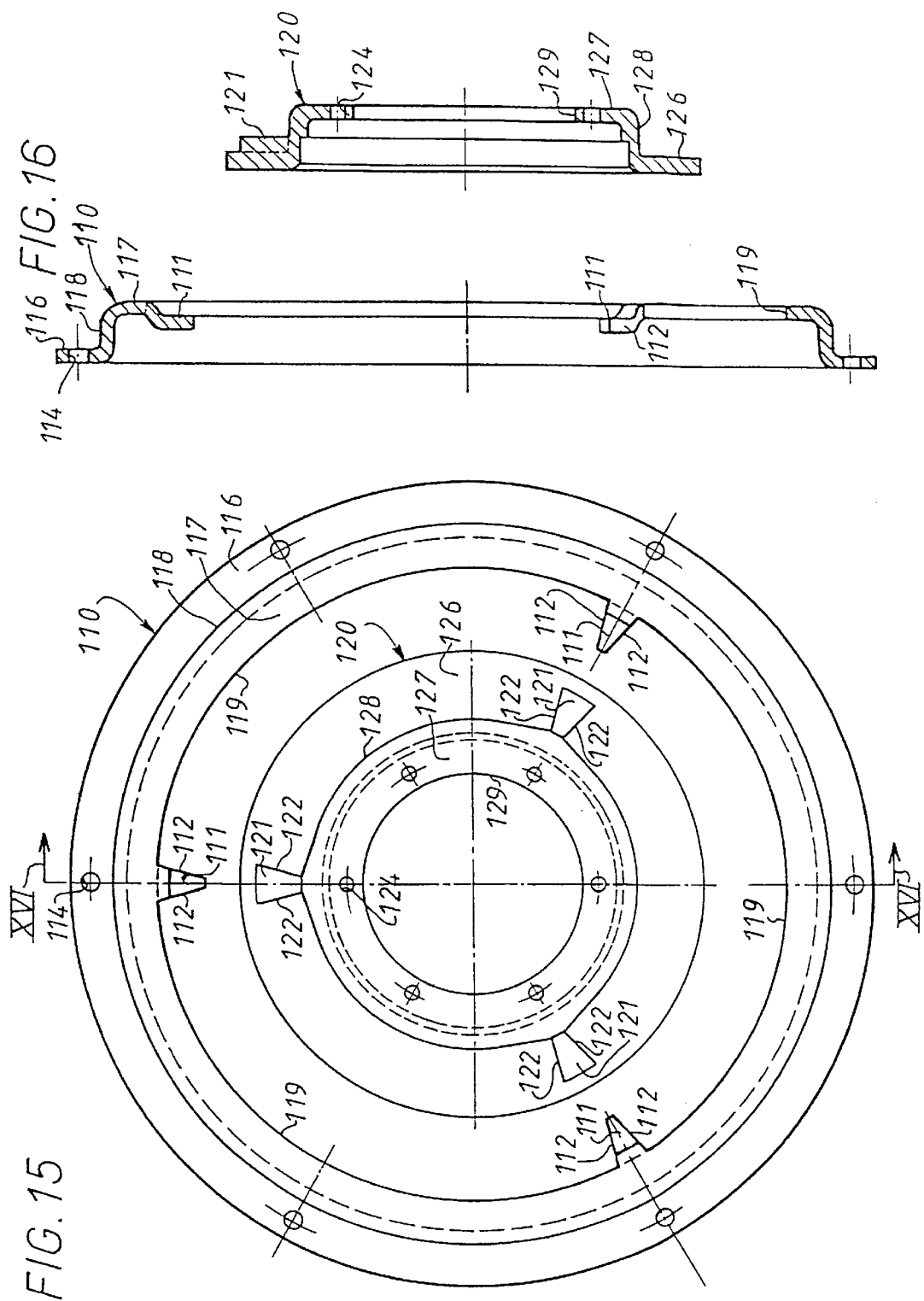

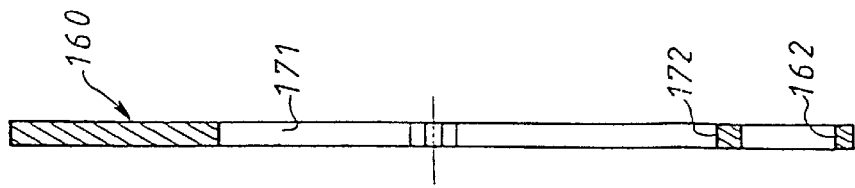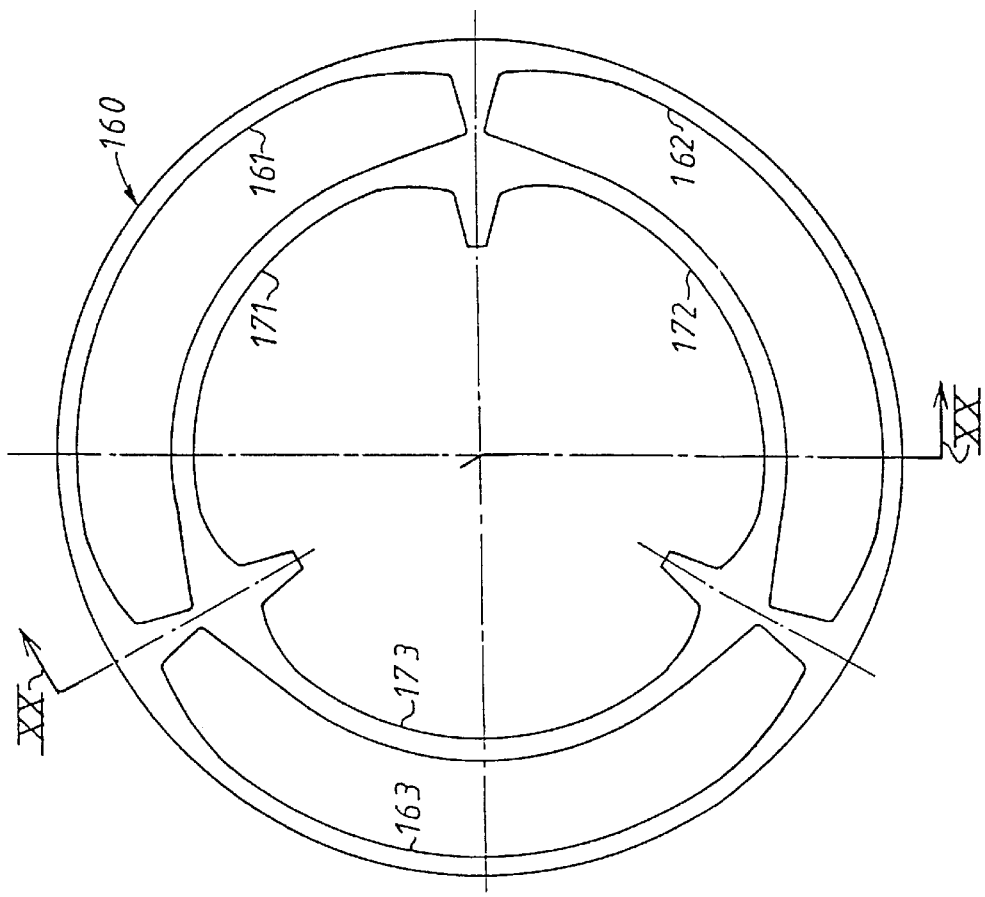

MOTOR VEHICLE DOUBLE FLYWHEEL TORSIONAL DAMPER

The present invention relates to a torsion damper for a double flywheel for a motor vehicle.

More precisely, it relates to a circumferentially acting torsion damper for a double flywheel for a motor vehicle, which is adapted to be disposed kinematically between the primary and secondary flywheels of the double flywheel, being of the kind comprising a first element adapted to be coupled to the primary flywheel, which is itself arranged to be coupled to the crankshaft of the engine of the vehicle, a second element adapted to be connected to the secondary flywheel, which is adapted to receive a clutch mechanism, the said damper including resilient means associated with friction means; as is known, such an arrangement gives excellent absorption of torsional oscillations generated by the engine, especially in slow running, resulting in a substantial reduction in noise, especially in the gearbox.

In this configuration, the torsion damper is of course one that operates with a high displacement; generally for this purpose, the resilient means are long helical springs, most commonly pre-curved, which are fitted in an annular channel formed mainly in the primary flywheel; having regard to the substantial length of the springs, the said annular channel is frequently at least partially filled with grease, and it is usual to place, between the outer periphery of the springs and the interior of the annular channel, a component for protection against wear; as is known, such an arrangement, of the same kind as that described for example in the document FR-A-2 601 104, is cumbersome.

It has previously been proposed to have, in a torsion damper, a group of springs disposed circumferentially so as to work in series through interposed phasing rings: this arrangement is described for example in the document U.S. Pat. No. 4,484,898; but here again, the arrangement is complicated, with the primary and secondary elements of the damper, and more particularly the second element, being provided with blinker-shaped supplementary members for locating the springs, in particular against the centrifugal force to which they are subjected, and despite the fact that the springs are of short length since, in the damper described in that document, there are three groups of three springs working in series.

The object of the present invention is to overcome these drawbacks.

Thus, according to the invention, a double flywheel for a motor vehicle, arranged to be disposed kinematically between the primary and secondary flywheels of the double flywheel, the first flywheel being adapted to be connected to the crankshaft of the engine of the vehicle and the secondary flywheel being adapted to receive a clutch mechanism, of the kind comprising a first element adapted to be connected to one of the said flywheels and a second element adapted to be connected to the other one of the said flywheels, the said damper including resilient means associated with friction means, the said resilient means consisting of at least one first group of springs working in series through interposed first phasing rings, is characterised by the fact that the said resilient means include a second group of springs working in series through interposed second phasing rings, the said first groups and second groups of springs working in series through an interposed phasing assembly.

Advantageously, each set consisting of the set of first groups and the set of second groups of springs is disposed on a pitch circle, and the two pitch circles are of different diameters. Preferably, the two pitch circles are in a common transverse plane at right angles to the axis of the damper, with one pitch circle surrounding the other. Preferably, the first element surrounds the second element. Thus, it is possible to obtain high angular displacements between the primary and secondary flywheels with a damper which is smaller in the axial sense and is of simple form.

Advantageously, the first element and the second element lie in the said transverse plane.

Preferably, the first element consists of a flat annular ring referred to as a first ring, having holes for fastening it to one of the flywheels, and radial lugs referred to as first lugs and having engagement surfaces and locating surfaces for the springs.

Advantageously, the second element consists of a flat annular ring referred to as a second ring, having holes for fastening it to the other one of the flywheels, and radial lugs, referred to as second lugs, having engagement surfaces and locating surfaces for the springs.

In another version, the first element is in the form of a hollow cover plate having an outer peripheral flange and a base portion which are joined together by a cylindrical skirt portion, the base portion having a central aperture and the flange being formed with holes for fastening it to one of the flywheels, with radial lugs referred to as first lugs, including engagement surfaces for the springs, projecting from the base portion and extending transversely in a plane which is offset axially inwards with respect to the plane of the base portion; preferably, the second element is in the form of a hollow cover plate having an external peripheral flange and a base portion which are joined together by a cylindrical skirt portion, the base portion having a central aperture and being formed with holes for fastening it to the other one of the flywheels, with radial lugs, referred to as second lugs and including engagement surfaces for the springs, being obtained by reforming the flange so that they lie transversely in a plane which is offset axially inwards with respect to the plane of the remainder of the flange.

Preferably, the phasing rings are frusto-conical in form and formed with oblique lugs having engagement surfaces and locating surfaces for the springs in the group of springs with which they are associated, the said oblique lugs intersecting the pitch circle of the said group of springs, the phasing rings being generally in a transverse plane spaced away from the transverse plane of symmetry of the damper. Thus, symmetrical transmission of the forces is obtained.

In an advantageous arrangement, the phasing assembly is an annular ring of generally X-shaped cross section defining wheel felloes, which include a first window for the first group of springs, together with a second window for the second group of springs.

Preferably, the inner peripheral portion and the outer peripheral portion of the said felloes are frusto-conical and are adapted to constitute means for centering and for rotational guiding of the phasing rings.

In another advantageous arrangement, the phasing assembly consists, inexpensively, of two identical members which are assembled back-to-back, each of the members being an annular ring of generally V-shaped cross section, the axis of which is parallel to the axis of the damper.

Preferably, the radial rings of the first element have a thickness smaller than that of the annular body of the said element and are connected to the inner periphery of the latter, which is frusto-conical with a cone angle corresponding to that of the first phasing rings.

Advantageously, the radial lugs of the second element have a thickness which is smaller than that of the annular body of the said element and are connected to the outer periphery of the latter, which is frusto-conical, with a cone angle corresponding to that of the second phasing rings.

In a further version, the phasing rings are generally flat and are provided with radial lugs which extend inwardly and include engagement surfaces and locating surfaces for the springs of the group of springs with which they are associated, the said lugs lying, by virtue of press-formed projecting elements, in a transverse plane which is offset axially with respect to the transverse plane in which the major part of the rings lies.

Preferably, the phasing assembly is a flat disc with a central aperture and includes a first window for the first group of springs, together with a slot, bounding the central aperture, for the first group of springs.

Advantageously, the phasing rings are guided axially by the phasing assembly which they enclose, and are centered by the latter and/or by the skirt portion of the second element which itself, in cooperation with the skirt portion of the first element, centers the phasing assembly.

Preferably, the damper includes a plurality of first groups of springs and the same number of second groups of springs, the first groups of springs, on the one hand, and the second groups of springs on the other hand, working in parallel.

Advantageously, the damper has three first groups and three second groups of springs.

In order to enable the subject matter of the invention to be better understood, an embodiment thereof, shown in the attached drawings, will now be described by way of purely illustrative and non-limiting example.

In these drawings:

FIG. 1 is a plan view of a damper for a double flywheel according to the invention;

FIG. 2 is a cross section taken on the line II—II in FIG. 1;

FIGS. 5 and 6 are views, in plan and in a cross section taken on the line VI—VI in FIG. 5 respectively, showing the first and second elements of the damper in FIGS. 1 to 4;

FIGS. 7 and 8 are views, in plan and in cross section taken on the line VIII—VIII in FIG. 7 respectively, showing the phasing rings of the damper in FIGS. 1 to 6;

FIGS. 9 and 10 are views, in plan and in cross section taken on the line X—X in FIG. 9 respectively, showing the phasing assembly of the damper in FIGS. 1 to 8;

Figure 12:
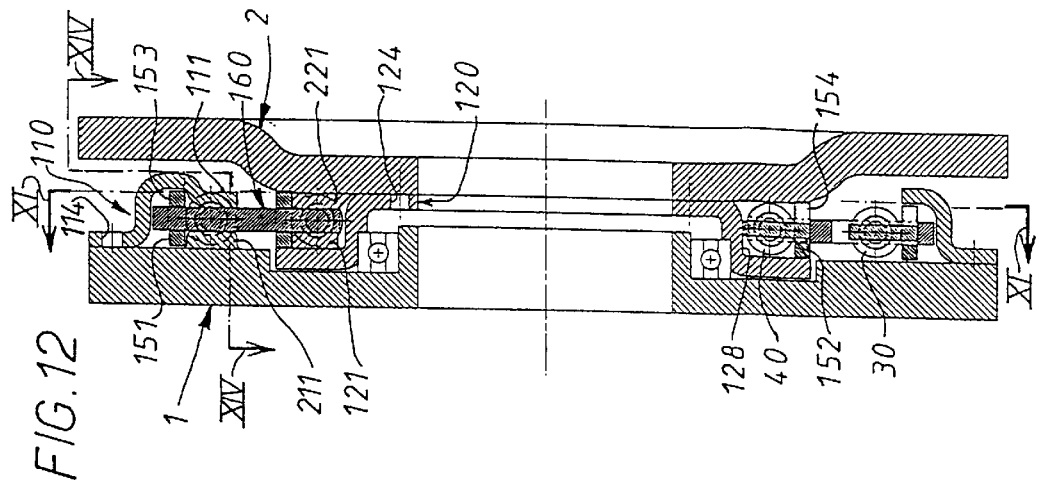
Figure 11:
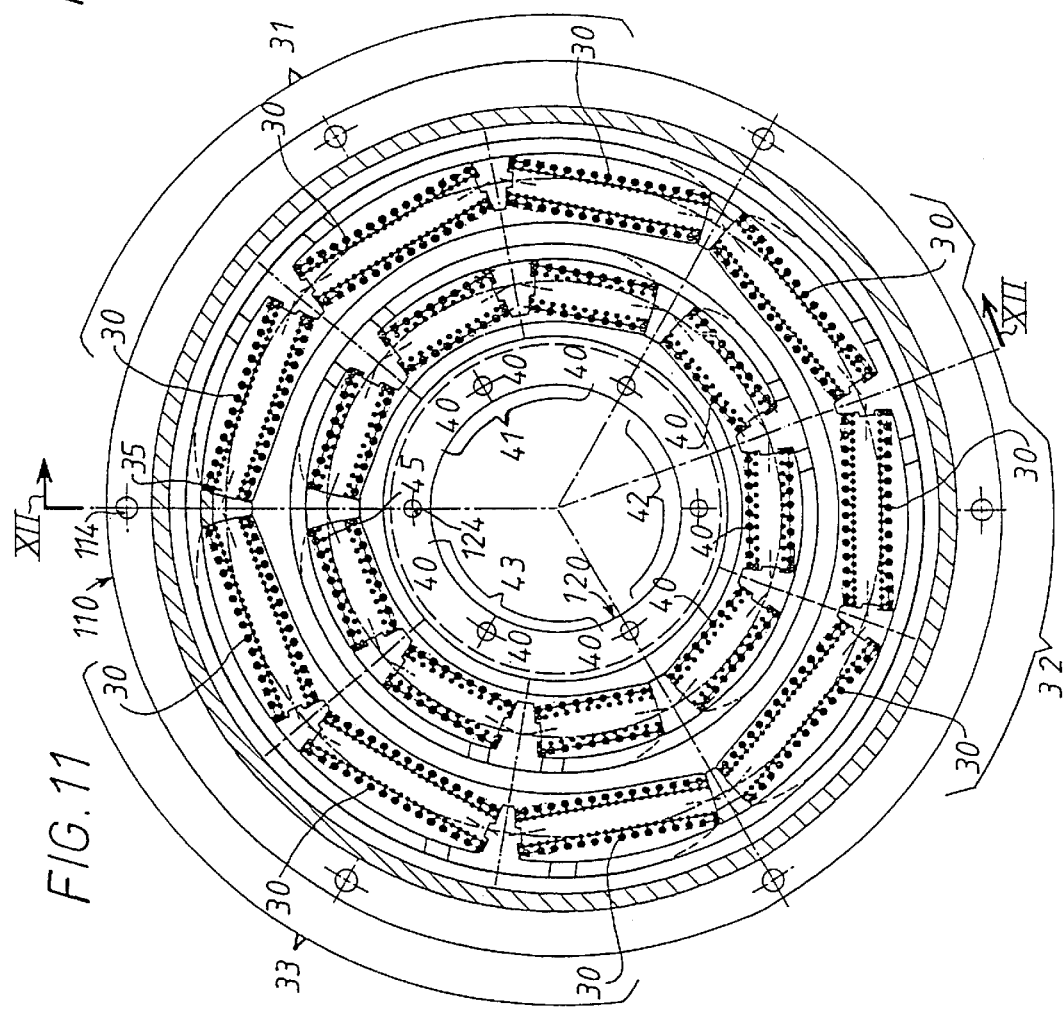
Figure 18:
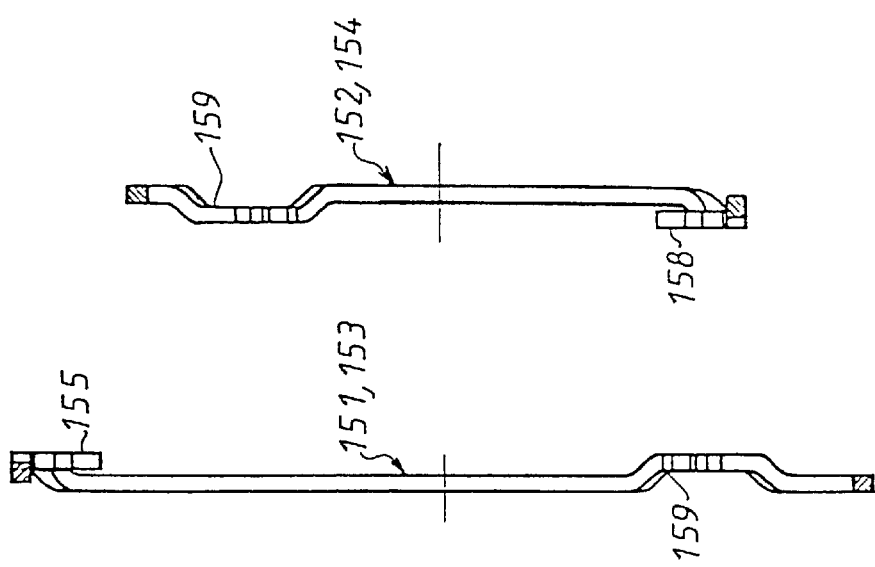
Figure 17:
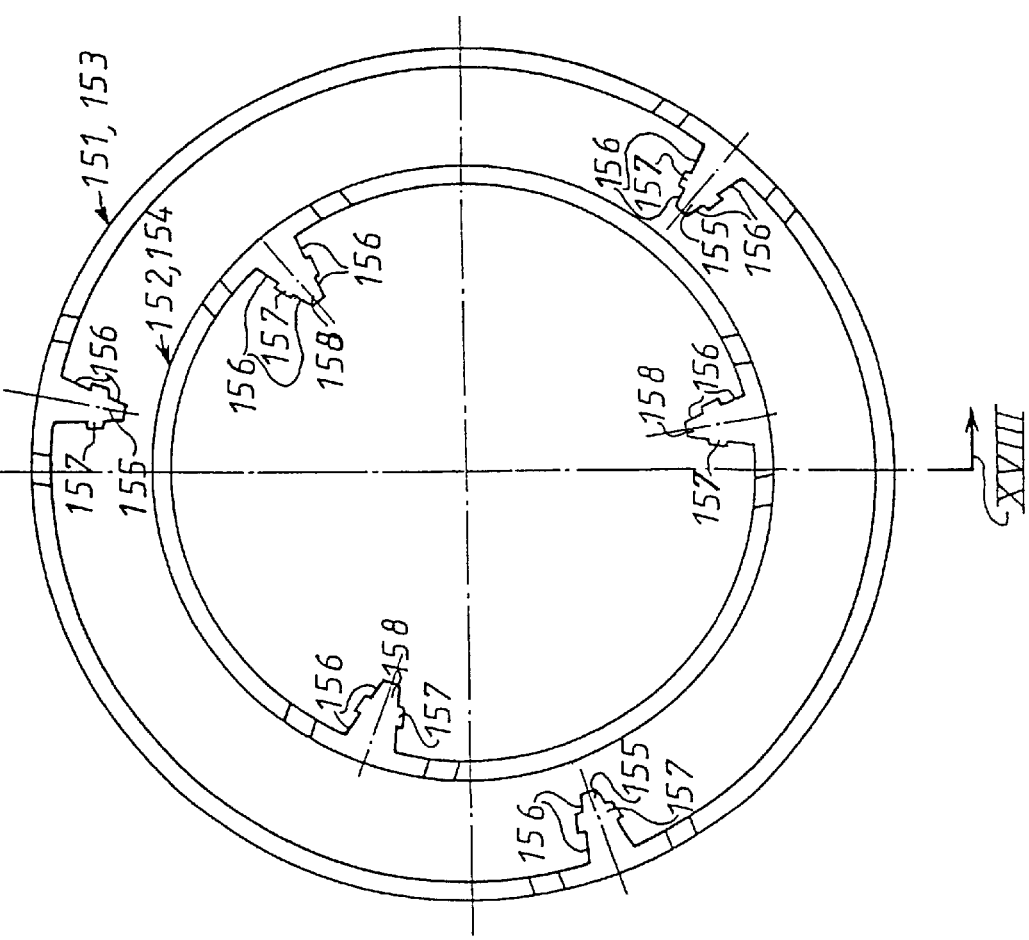

FIGS. 11 and 1 2 are similar to FIGS. 1 and 2, and show another version, in which FIG. 11 is a view in cross section taken on the line XI—XI in FIG. 1 2, while FIG. 12 is a view in cross section taken on the line XII—XII in FIG. 11;

FIG. 13 is similar to FIG. 11, after rotation of one of the first and second elements with respect to the other;

FIG. 14 is a scrap view in cross section taken on the line XIV—XIV in FIG. 12;

FIGS. 15 and 16 are views, in plan and in cross section taken on the line XVI—XVI in FIG. 15 respectively, showing the first and second elements of the damper in FIGS. 11 to 14;

FIGS. 17 and 18 are views, in plan and in cross section taken on the line XVIII—XVIII in FIG. 17 respectively, showing the phasing rings in the damper of FIGS. 11 to 16;

FIGS. 19 and 20 are views, in plan and in cross section taken on the line XX—XX in FIG. 19 respectively, showing the phasing assembly in the damper of FIGS. 11 to 18.

The damper shown in FIGS. 1 to 10, which is designed for equipping a motor vehicle, comprises a first element 10 which is adapted to be connected to the primary flywheel of a double flywheel, together with a second element 20 which is adapted to be connected to the secondary flywheel of the double flywheel.

The primary flywheel, which is equipped with a starter crown, is arranged to be connected to the crankshaft of the engine of the motor vehicle; the secondary flywheel is arranged to receive a clutch mechanism, not shown, and constitutes a reaction plate which is adapted to cooperate with a friction disc, not shown, which is associated with the said clutch mechanism; the secondary flywheel is thus designed to be coupled in rotation releasably to the input shaft of the gearbox via the clutch mechanism.

A rolling bearing means is disposed between the primary flywheel and the secondary flywheel.

The circumferentially acting torsion damper is disposed kinematically between the primary and secondary flywheels.

The damper comprises resilient means associated with friction means.

The friction means are disposed in the usual way, so as to act between the primary and secondary flywheels; they are of the conventional type, for example of the cassette type such as those which are described in the French patent application filed on May 4, 1995 under the number 95 05332, and for this reason they are not shown and will not be described here.

The resilient means consist of helical springs 30, 40 which are disposed circumferentially.

More precisely, the resilient means consist of a set of helical springs 30 which are arranged generally on a pitch circle 35, together with a set of helical springs 40 which are disposed on a pitch circle 45, the diameter of which is smaller than that of the pitch circle 35.

The springs 30 in this example are distributed in three groups 31, 32, 33, referred to as the first groups, with each first group comprising in this example three springs 30.

The springs 40 are divided into three groups 41, 42, 43 which are referred to as the second groups, with each second group comprising three springs 40.

The springs 30 in each first group 31, 32, 33 work in series through interposed first phasing rings, which in this example consist of two first phasing rings 51 and 53; the two first phasing rings 51 and 53 are identical to each other; each first phasing ring 51 or 53, which can be seen more clearly in FIGS. 7 and 8, is of frusto-conical form and is formed with oblique lugs 55, which extend from the outer periphery of the ring towards the axis of the latter; the first phasing ring 51 or 53 has as many oblique lugs 55 as there are first groups of springs, that is to say in this example three; each oblique lug 55 includes lateral engagement surfaces 56 for the springs 30, which are disposed generally radially with respect to the latter and which are located on either side of locating surfaces 57 which project slightly with respect to the engagement surfaces 56, and which are arranged to center the ends of the springs 30 with respect to the oblique lugs 55.

The springs 40 in each second group of springs 41, 42, 43 work in series through two interposed second phasing rings 52 and 54, which are identical with each other and which, again, can be seen in FIGS. 7 and 8; each second phasing ring 52 or 54 is frusto-conical in form and is formed with oblique lugs 58 which extend from the outer periphery of the ring, away from the axis of the latter; the oblique lugs 58, of which there are three in this example, again include lateral engagement surfaces 56 for the springs 40, which are disposed generally radially with respect to the latter and which are located on either side of locating surfaces 57 that project slightly with respect to the engagement surfaces 56.

FIGS. 5 and 6 show the first and second elements 10 and 20 respectively by themselves; these elements are generally flat and annular in form.

The first element 10 has radial lugs 11 at its inner periphery, there being three lugs 11 in this example, and each of which has lateral engagement surfaces 12 which include a locating surface 13; holes 14, spaced apart circumferentially and formed in the first element 10, enable the latter to be secured on the primary flywheel.

The second element 20 has radial lugs 21 at its outer periphery, there being three lugs 21 in this example, and each of which has lateral engagement surfaces 22 which include a locating surface 23; holes 24, spaced apart circumferentially and formed in the second element 20, enable the latter to be secured on the secondary flywheel.

The phasing assembly 60, which can best be seen in FIGS. 9 and 10, consists of two identical annular members 64, 65, which are press-formed from metal plate and which are assembled back to back by means of rivets, not shown, which are passed through holes 68 which are formed in aligned relationship therein; each of the members 64, 65 is an annular ring having a cross section of generally flattened V-shaped form, the axis of which is parallel to the axis of the annular ring; each of the members 64, 65 is therefore a kind of wheel felloe or rim, and when the two felloes or rim 64, 65 are assembled back to back, the phasing assembly 60 consists of an annular ring with a generally X-shaped cross section.

More precisely, each fellow or rim 64, 65 has an annular flat portion 74 which is recessed in its middle zone with an annular channel 75 having a flat base; it is by means of the flat base of this channel that the two felloes or rim 64 and 65 are in back-to-back contact with each other; the flat portion 74 is bounded radially by an outer peripheral portion 67 and an inner peripheral portion 68, which are frustoconical; the cone angle of the outer peripheral portion 67 corresponds to the cone angle of the frusto-conical first phasing rings 51 and 53, while the cone angle of the inner periphery 66 corresponds to the cone angle of the frusto-conical second phasing rings 52 and 54; because of this arrangement, the felloes or rim 64 and 65 serve as means for centering and guidance in rotation, for the phasing rings 51 and 54.

Each felloe or rim 64 and 65 includes first windows 61, 62, 63, each of which is adapted to receive a first group 31, 32, 33 of springs, and second windows 71, 72, 73, each of which is adapted to receive a second group 41, 42, 43 of springs.

The first windows 61, 62, 63 and the second windows 71, 72, 73 extend circumferentially: in this example there are three first windows and three second windows; the second windows are aligned radially with the first windows; a first window and a second window are located radially on either side of the annular channel 75.

When the torsion damper is fitted in position, it can be seen from FIG. 2 that the first element 10 has its transverse plane of symmetry, which is also generally that of the second element 20 and of the damper; the radial lugs 11 and 21 of the first element 10 and second element 20 come between the felloes 64, 65, the radial lugs 11 come within the upper part of the X-shaped cross section of the phasing assembly 60, and the radial lugs 21 come within the lower part of the X-shaped cross section.

The first phasing rings 51 and 53 are disposed respectively between the outer peripheral portions 67 of the felloes 64 and 65 and the first element 10, on either side of the latter; it can be seen both from FIG. 2 and from FIG. 6, that the radial lugs 11 of the first element 10 are less thick than the annular body of the said element, and that they are joined to the inner periphery 15 of the latter, which is frusto-conical, with an angle corresponding to that of the first phasing rings 51 and 53, which are well centered and well guided between the peripheries 67 of the phasing assembly 60 and the said periphery 15.

The second phasing rings 52 and 54 are disposed respectively between the inner peripheral portions 66 of the felloes 64 and 65 and the second element 20, on either side of the latter; it can be seen that, as with the radial lugs 11 of the first element 10, the radial lugs 21 of the second element 20 have a thickness which is smaller than that of the annular body of the said element, and that they are joined to the outer periphery 25 of the latter, which is frusto-conical, with an angle corresponding to that of the second phasing rings 52 and 54, which are well centered and well guided between the peripheries 66 of the phasing assembly 60 and the said periphery 25.

One of the two springs 30 located at the ends of each first group 31, 32, 33 of springs is in engagement on the edge of a first window 61, 62, 63 of the phasing assembly 60, while the other spring is in engagement on a lug 11 of the first element 10; between two of these springs 30, there is located a lug 55 of a first phasing ring 51 on the one hand, and a lug 55 of a second phasing ring 53 on the other hand.

One of the two springs 40 located at the ends of each second group 41, 42, 43 of springs is in engagement on the edge of a second window 71, 72, 73 of the phasing assembly 60, while the other one is in engagement on a lug 21 of the second element 20; between two of these springs 40, there is located a lug 58 of a second phasing ring 52 on the one hand and a lug 58 of a second phasing ring 54 on the other hand.

Figure 4:
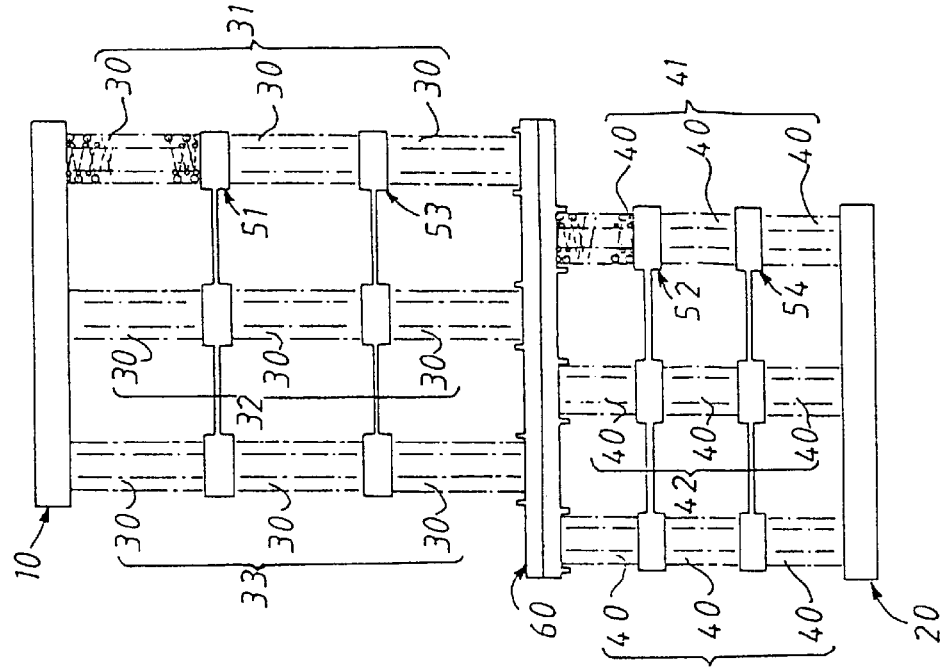
FIG. 4 is a partial diagrammatic view showing the series-parallel mounting of the resilient means in the damper of FIGS. 1 to 3.

FIG. 4 shows diagrammatically the kinematic mounting of the various elements. As can be seen, each first group 31, 32, 33 works in series with each second group 41, 42, 43, with the three first groups 31, 32, 33 working in parallel as do the three second groups 41, 42, 43.

The phasing rings 51, 52, 53, 54, and the phasing assembly 60, are mounted for free rotation with respect to the first element 10 and second element 20, in the manner to be described below.

The operation of the torsion damper according to the invention follows from the description which has just been given.

Figure 3:
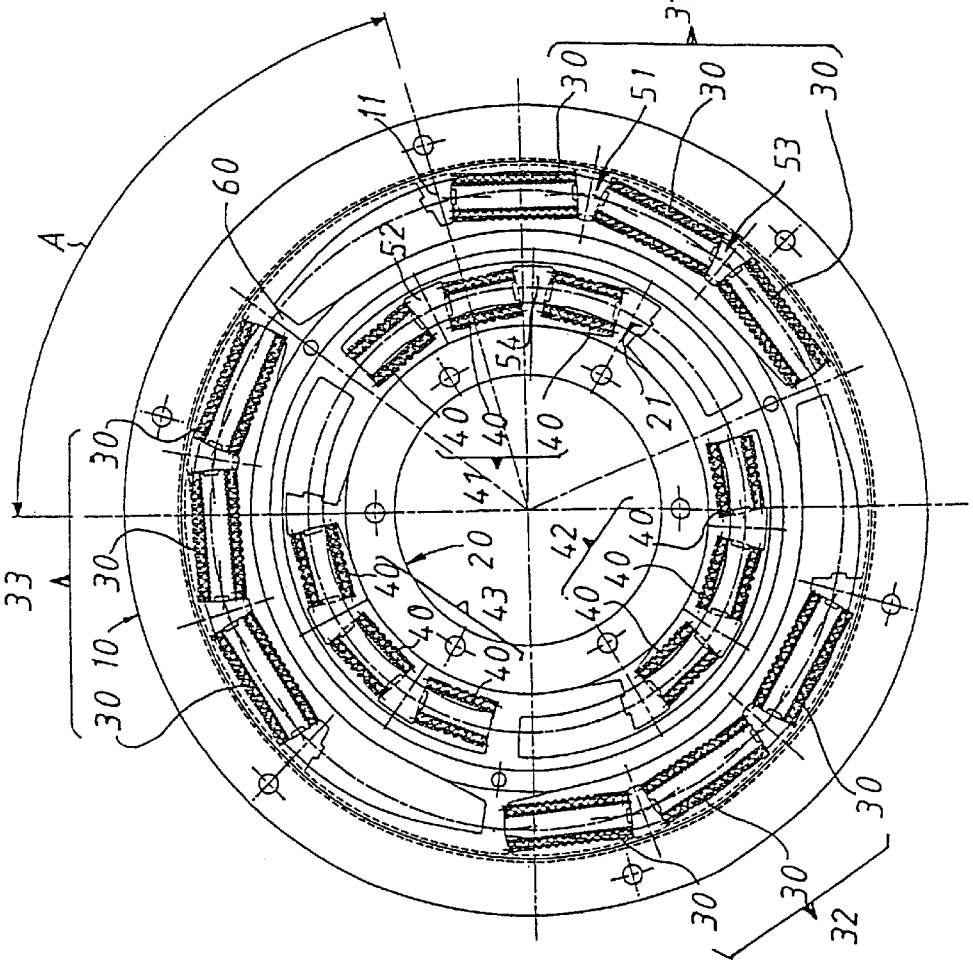
FIG. 3 is similar to FIG. 1, after rotation of one of the first and second elements with respect to the other.

When the first element 10 and the second element 20 are in rotational motion with respect to each other, due to the relative rotating movement of the primary and secondary flywheels of the double flywheel to which they are connected, respectively, the springs 30 and 40 become compressed: FIG. 3 shows such a position in which the springs are compressed; in this Figure, the second element 20 occupies the same position as it does in FIG. 1, while the first element 10 has turned with respect to the second element 20 in the clockwise direction with reference to the Figure, through an angle A of about 75 degrees.

As is known per se, the action of friction means does of course accompany that of the resilient means 30 and 40 during the relative angular displacement of the first element 10 and second element 20.

The invention makes it possible to obtain in a simple manner an enlarged relative angular displacement in a damper the size of which is reduced in both the axial and diametral senses. In addition, with only two phasing rings for each group of springs, the springs are short.

Moreover, as can be seen in the drawings, the lugs 11 of the first element 10 and the lugs 21 of the second element 20 are in line with each other, which is favorable from the point of view of balancing of the damper.

In the damper that has just been described, the first element 10 and the second element 20 lie in a common transverse plane at right angles to the axis of the damper, which in general terms is a plane of symmetry of the said damper; but the structure of the damper can of course be reversed as is shown in the modified form given in FIGS. 11 to 20.

In this version, the first element 110 and the second element 120 lie on either side of the said transverse plane, while it is the phasing assembly 160 that lies in this plane.

More precisely, the first element 110 is in the form of a hollow cover plate having an outer peripheral flange 116 and a base portion 117, which are joined together through a cylindrical skirt portion 118; the base portion 117 has a central aperture 119; the flange 116 is formed with holes 114 for fastening it, for example by means of screws, to one of the flywheels which in this example is the primary flywheel 1; the first element 110 has radial lugs 111, or first lugs, which have engagement surfaces 112 for the springs, in this example the springs 30; the lugs 111 project from the base portion 117 and extend transversely in a plane which is offset axially inwards with respect to the plane of the base portion 117.

The second element 120 is again in the form of a hollow cover plate having an outer peripheral flange 126 and a base portion 127, which are joined together by a cylindrical skirt portion 128; the base portion 127 has a central aperture and is formed with holes 124 for fastening it to the other flywheel, which is the secondary flywheel 2 in this example; the second element 120 has radial lugs 121 or second lugs, which have engagement surfaces 122 for the springs, in this case the springs 40; these lugs 121 are made by reforming the flange 126, for example by stamping; they extend transversely in a plane which is offset axially inward with respect to the remainder of the flange 126.

Phasing rings 151, 153 are associated with the springs 30, and phasing rings 152, 154 are associated with the springs 40, which are surrounded by the springs 30. The phasing rings are of simplified form.

The phasing rings are generally flat in form, and have inwardly directed radial lugs 155, 158 respectively; these lugs include engagement surfaces 156 and locating surfaces 157 for the springs; the said lugs lie, by virtue of press-formed projections 159, in a transverse plane which is offset axially with respect to the transverse plane in which the major part of the rings 151, 152, 153, 154 lies.

In this example, the phasing assembly 160 is a flat disc with a central aperture; it has three windows 161, 162, 163 which extend circumferentially and which are adapted to receive the three first groups 31, 32, 33 of springs 30; its central aperture is cut out in such a way as to have three notches 171, 172, 173 which bound it and which are adapted to receive the three second groups 41, 42, 43 of springs 40.

The various components of the damper which have just been described are so arranged that all of the forces which are transmitted to it are disposed symmetrically with respect to the transverse plane of symmetry of the phasing assembly 160, and have resultants which lie in that plane.

For this purpose, in this example the projecting elements 159 of the phasing rings 151 to 154 are such that the lugs 155, 158 lie in this plane of symmetry, as can be seen in FIG. 14.

The primary flywheel 1 carries bosses 211 in the form of lugs which are situated in line with the lugs 111 of the first element 110, for symmetrical engagement with the springs 30; the secondary flywheel 2 carries bosses 221, in the form of lugs lying in line with the lugs 121 of the second element 120 for symmetrical engagement of the springs 40.

These bosses 211 and 221 can of course, instead of being an integral part of the flywheels, be replaced by lugs which are carried by the phasing rings attached on the flywheels, or they can be fixed, respectively, with respect to the first and second elements, so that the damper is made in the form of a sub-assembly.

The phasing rings 151 and 153 having the larger diameter are located axially, with one of them, 151, between the primary flywheel 1 and the phasing assembly 160, and with the other phasing ring, 153, being between the latter and the base portion 117 of the first element 110, and they are centered by the phasing element 160.

The phasing rings 152 and 154 having the smaller diameter are located axially, with one of them, 152, between the flange 126 of the second element 120 and the phasing assembly 160, and with the other phasing ring, 154, being between the latter and the secondary flywheel 2, the phasing rings being centered by the phasing assembly 160 and the skirt portion 128 of the second element 120.

Between the internal face of the said skirt portion 128 and the hub of the primary flywheel, there is fitted an anti-friction means, which in this example is a ball bearing, and which provides relative centering between the primary flywheel 1 and the secondary flywheel 2.

The phasing assembly 160 is itself centered by the skirt portions 118 and 128 of the first element 110 and second element 120.

Operation of this version is identical to that described with reference to FIGS. 1 to 10.

What is claimed is:

1. A circumferentially acting torsion damper for a double flywheel for a motor vehicle, to be disposed kinematically between the primary and secondary flywheels of the double flywheel, the first flywheel being adapted to be connected to the crankshaft of the engine of the vehicle and the secondary flywheel being adapted to receive a clutch mechanism, of the kind comprising a first element (10, 110) adapted to be connected to one of the said flywheels and a second element (20, 120) adapted to be connected to the other one of the said flywheels, the said damper including resilient means (30, 40) associated with friction means, the said resilient means consisting of at least one first group (31, 32, 33) of springs (30) working in series through interposed first phasing rings (51, 53, 151, 153), characterised by the fact that the said resilient means include a second group (41, 42, 43) of springs (40) working in series through interposed second phasing rings (52, 54, 152, 154), the said first groups (31, 32, 33) and second groups (41, 42, 43) of springs (30, 40) working in series through an interposed phasing assembly (60, 160).

2. A torsion damper according to claim 1, characterised by the fact that each set consisting of the set of first groups (31, 32, 33) and the set of second groups (41, 42, 43) of springs is disposed on a pitch circle (35, 45), and the two pitch circles (35, 45) are of different diameters.

3. A torsion damper according to claim 2, characterised by the fact that the two pitch circles (35, 45) are in a common transverse plane at right angles to the axis of the damper, with one pitch circle surrounding the other.

4. A torsion damper according to claim 3, characterised by the fact that the first element (10, 110) surrounds the second element (20, 120).

5. A torsion damper according to claim 4, characterised by the fact that the first element (10) and the second element (20) lie in the said transverse plane.

6. A torsion damper according to claim 5, characterised by the fact that the first element (10) consists of a flat annular ring referred to as a first ring, having holes (14) for fastening it to one of the flywheels, and radial lugs (11) referred to as first lugs and having engagement surfaces (12) and locating surfaces (13) for the springs.

7. A torsion damper according to claim 5, characterised by the fact that the second element (20) consists of a flat annular ring referred to as a second ring, having holes (24) for fastening it to the other one of the flywheels, and radial lugs (21), referred to as second lugs, having engagement surfaces (22) and locating surfaces (23) for the springs.

8. A torsion damper according to claim 4, characterised by the fact that the first element (110) is in the form of a hollow cover plate having an outer peripheral flange (116) and a base portion (117) which are joined together by a cylindrical skirt portion (118), the base portion (117) having a central aperture (119) and the flange (116) being formed with holes (114) for fastening it to one of the flywheels, with radial lugs (111) referred to as first lugs, including engagement surfaces (112) for the springs, projecting from the base portion (117) and extending transversely in a plane which is offset axially inwards with respect to the plane of the base portion (117).

9. A torsion damper according to claim 4, characterised by the fact that the second element (120) is in the form of a hollow cover plate having an external peripheral flange (126) and a base portion (127) which are joined together by a cylindrical skirt portion (128), the base portion (127) having a central aperture (129) and being formed with holes (124) for fastening it to the other one of the flywheels, with radial lugs (121), referred to as second lugs and including engagement surfaces (122) for the springs, being obtained by reforming the flange (126) so that they lie transversely in a plane which is offset axially inwards with respect to the plane of the remainder of the flange (126).

10. A torsion damper according to claim 5, characterised by the fact that the phasing rings (51, 52, 53, 54) are frusto-conical in form and formed with oblique lugs (55, 58) having engagement surfaces (56) and locating surfaces (57) for the springs (30, 40) in the group of springs with which they are associated, the said oblique lugs (55, 58) intersecting the pitch circle (35, 45) of the said group of springs, the phasing rings (51, 52, 53, 54) being generally in a transverse plane spaced away from the transverse plane of symmetry of the damper.

11. A torsion damper according to claim 5, characterised by the fact that the phasing assembly (60) is an annular ring of generally X-shaped cross section defining wheel felloes (64, 65), which include a first window (61, 62, 63) for the first group (31, 32, 33) of springs, together with a second window (71, 72, 73) for the second group (41, 42, 43) of springs.

12. A torsion damper according to claim 11, characterised by the fact that the inner peripheral portion (66) and the outer peripheral portion (67) of the said felloes (64, 65) are frusto-conical and are adapted to constitute means for centering and for rotational guiding of the phasing rings (51, 52, 53, 54).

13. A torsion damper according to claim 11, characterised by the fact that the phasing assembly (60) consists of two identical members (64, 65) which are assembled back-to-back, each of the members being an annular ring of generally V-shaped cross section, the axis of which is parallel to the axis of the annular ring.

14. A torsion damper according to claim 5, characterised by the fact that the radial rings (11) of the first element (10) have a thickness smaller than that of the annular body of the said element and are connected to the inner periphery (15) of the latter, which is frusto-conical with a cone angle corresponding to that of the first phasing rings (51, 53).

15. A torsion damper according to claim 7, characterised by the fact that the radial lugs (21) of the second element (20) have a thickness which is smaller than that of the annular body of the said element and are connected to the outer periphery (25) of the latter, which is frusto-conical with a cone angle corresponding to that of the second phasing rings (52, 54).

16. A torsion damper according to claim 4, characterised by the fact that the phasing rings (151, 152, 153, 154) are generally flat and are provided with radial lugs (155, 158) which extend inwardly and include engagement surfaces (156) and locating surfaces (157) for the springs (30, 40) of the group of springs with which they are associated, the said lugs (155, 158) lying, by virtue of press-formed projecting elements (159), in a transverse plane which is offset axially with respect to the transverse plane in which the major part of the rings lies.

17. A torsion damper according to claim 4, characterised by the fact that the phasing assembly (160) is a flat disc with a central aperture and includes a first window (161, 162, 163) for the first group (31, 32, 33) of springs, together with a slot (171, 172, 173), bounding the central aperture, for the first group (41, 42, 43) of springs.

18. A torsion damper according to claim 4, characterised by the fact that the phasing rings (151, 152, 153, 154) are guided axially by the phasing assembly (160) which they enclose, and are centered by the latter (160) and/or by the skirt portion (128) of the second element (120) which itself, in cooperation with the skirt portion (118) of the first element (110), centers the phasing assembly (160).

19. A torsion damper according to claim 1, characterised by the fact that it includes a plurality of first groups (31, 32, 33) of springs and the same number of second groups (41, 42, 43) of springs, the first groups of springs (31, 32, 33), on the one hand, and the second groups (41, 42, 43) of springs on the other hand, working in parallel.

20. A torsion damper according to claim 19, characterised by the fact that it has three first groups (31, 32, 33) and three second groups (41, 42, 43) of springs.

* * * * *